US006351354B1

(12) United States Patent
Bonin

(10) Patent No.: US 6,351,354 B1
(45) Date of Patent: Feb. 26, 2002

(54) HEAD TO FLEXURE INTERCONNECTION FOR DISC DRIVE MICROACTUATOR

(75) Inventor: Wayne A. Bonin, North Oaks, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/356,544

(22) Filed: Jul. 19, 1999

Related U.S. Application Data

(60) Provisional application No. 60/133,206, filed on May 7, 1999.

(51) Int. Cl.⁷ .................................................. G11B 5/55
(52) U.S. Cl. ............................. 360/294.6; 360/245.9; 360/246.7
(58) Field of Search ................. 360/246.7, 294.1–294.7, 360/264.4, 264.5, 245.8, 245.9, 78.05

(56) References Cited

U.S. PATENT DOCUMENTS

| 3,924,268 A | 12/1975 | McIntosh et al. ............. 360/78 |
| 4,374,402 A | 2/1983 | Blessom et al. ............ 360/104 |
| 4,651,242 A | 3/1987 | Hirano et al. ............... 360/103 |
| 4,764,829 A | 8/1988 | Makino ..................... 360/106 |
| 4,914,725 A | 4/1990 | Belser et al. ............... 318/560 |

(List continued on next page.)

FOREIGN PATENT DOCUMENTS

| EP | 0 412 221 B1 | 11/1989 |
| JP | 63-122069 | 5/1988 |
| JP | 02-263369 | 4/1989 |
| JP | 04-134681 | 5/1992 |
| JP | 04-368676 | 12/1992 |
| JP | 05-094682 | 4/1993 |
| JP | 06-020412 | 1/1994 |
| JP | 07-085621 | 3/1995 |

OTHER PUBLICATIONS

"Silicon Micromachined Electromagnetic Microactuators for Rigid Disk Drives" by Tang et al, *IEEE Transactions on Magnetics*, vol. 31, No. 6, Nov. 1995.
"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.
"A Flexural Piggyback Milli–Actuator for Over 5 Gbit/in² Density Magnetic Recording" by Koganezawa et al, *IEEE Transactions on Magnetics*, vol. 32, No. 5, Sep. 1996.
"Transverse Mode Electrostatic Microactuator for MEMS– Based HDD Slider" by Imamura et al, *IEEE* 1996.
"An Experiment for Head Positioning System Using Submicron Track–width GMR Head" by Yoshikawa et al., *IEEE Transactions on Magnetics*, vol. 32, No. 5, Sep. 1996.
"Micro Electrostatic Actuators in Dual–Stage Disk Drives with High Track Density" by Tang et al., *IEEE Transactions on Magnetics*, vol. 32, No. 5, Sep. 1996.

(List continued on next page.)

*Primary Examiner*—Brian E. Miller
(74) *Attorney, Agent, or Firm*—Kinney & Lange, P.A.

(57) ABSTRACT

A disc drive implementing a dual-stage actuation system having an improved scheme for electrically interconnecting a transducing head to a flexure includes a support structure supporting a slider in proximity to a surface of a rotatable disc. The support structure is coarsely positionable by a main actuator. A microactuator is also provided, including a stator attached to the support structure and a rotor operatively attached to the slider. The rotor is connected to the stator by at least one flexible beam. A first electrical interconnect is formed between the support structure and the stator of the microactuator. A conductive trace is formed on the flexible beam between the stator and the rotor of the microactuator. A second electrical interconnect is formed between the rotor of the microactuator and at least one bond pad on the slider electrically connected to the transducing head.

15 Claims, 8 Drawing Sheets

U.S. PATENT DOCUMENTS

| | | | |
|---|---|---|---|
| 5,021,906 A | | 6/1991 | Chang et al. ............... 360/103 |
| 5,025,346 A | | 6/1991 | Tang et al. ................. 361/283 |
| 5,177,652 A | | 1/1993 | Yamaguchi et al. ..... 360/78.05 |
| 5,189,578 A | | 2/1993 | Mori et al. ................. 360/106 |
| 5,303,105 A | | 4/1994 | Jorgenson ................... 360/106 |
| 5,364,742 A | | 11/1994 | Fan et al. ................... 430/317 |
| 5,463,513 A | | 10/1995 | Hoshino ..................... 360/104 |
| 5,521,778 A | | 5/1996 | Boutaghou et al. ......... 360/106 |
| 5,657,188 A | * | 8/1997 | Jurgenson et al. .......... 360/106 |
| 5,711,063 A | | 1/1998 | Budde et al. ............ 29/603.06 |
| 5,745,319 A | | 4/1998 | Takekado et al. ........ 360/78.05 |
| 5,764,444 A | | 6/1998 | Imamura et al. ............. 360/109 |
| 5,781,381 A | | 7/1998 | Koganezawa et al. ...... 360/106 |
| 5,793,571 A | | 8/1998 | Jurgenson et al. .......... 360/104 |
| 5,796,558 A | | 8/1998 | Hanrahan et al. ........... 360/106 |
| 5,802,701 A | | 9/1998 | Fontana et al. .......... 29/603.14 |
| 5,805,375 A | | 9/1998 | Fan et al. ................. 360/78.12 |
| 5,809,634 A | | 9/1998 | Inaba ...................... 29/603.04 |
| 5,834,864 A | * | 11/1998 | Hesterman et al. ... 310/40 MM |
| 5,856,896 A | | 1/1999 | Berg et al. .................. 360/104 |
| 5,857,257 A | | 1/1999 | Inaba ...................... 29/603.04 |
| 5,862,010 A | | 1/1999 | Simmons et al. ........ 360/97.01 |
| 5,867,347 A | | 2/1999 | Knight et al. ............... 360/104 |
| 5,873,159 A | | 2/1999 | Arya et al. .............. 29/603.03 |
| 5,896,246 A | | 4/1999 | Budde et al. ............... 360/104 |
| 5,896,248 A | | 4/1999 | Hanrahan et al. ........... 360/104 |
| 5,898,541 A | | 4/1999 | Boutaghou et al. ......... 360/109 |
| 5,898,544 A | | 4/1999 | Krinke et al. ............... 360/104 |
| 5,936,805 A | * | 8/1999 | Imaino ....................... 360/104 |
| 5,943,189 A | * | 8/1999 | Boutaghou et al. ......... 360/103 |
| 5,959,808 A | * | 9/1999 | Fan et al. .................... 360/106 |
| 6,025,988 A | * | 2/2000 | Yan ............................. 361/685 |
| 6,038,104 A | * | 3/2000 | Sato et al. .................. 360/106 |
| 6,067,215 A | * | 5/2000 | Zhang ......................... 360/260 |
| 6,069,771 A | * | 5/2000 | Boutaghou et al. ......... 360/104 |
| 6,078,473 A | * | 6/2000 | Crane et al. ................. 360/104 |
| 6,078,476 A | * | 6/2000 | Magee et al. ............... 360/106 |
| 6,115,223 A | * | 9/2000 | Berg et al. ............... 360/294.4 |
| 6,178,069 B1 | * | 1/2001 | Suzuki .................... 360/294.5 |
| 6,259,584 B1 | * | 7/2001 | Cini et al. ............... 360/294.6 |
| 6,308,573 B1 | * | 10/2001 | Lee et al. ...................... 73/652 |

OTHER PUBLICATIONS

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3½ Inch Inline HDD Using Multilayer Piezoelectric Load/Unload Mechanism" by Kajitani et al., *IEEE Transactions on Magnetics*, vol. 27, No. 6, Nov. 1991.

"Design, Fabrication, and Testing of Silicon Microgimbals for Super–Compact Rigid Disk Drives" by Temesvary et al., *Journal of Microelectromechanical Systems*, vol. 4, No. 1, Mar. 1995.

* cited by examiner

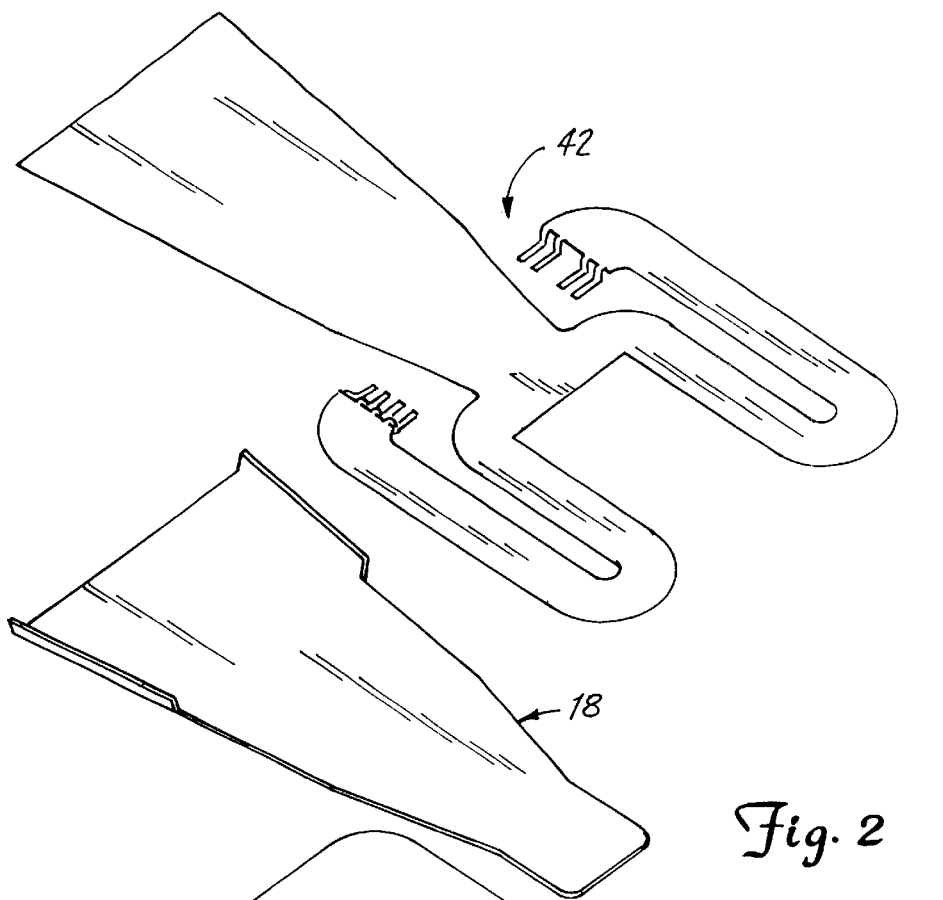
Fig. 2
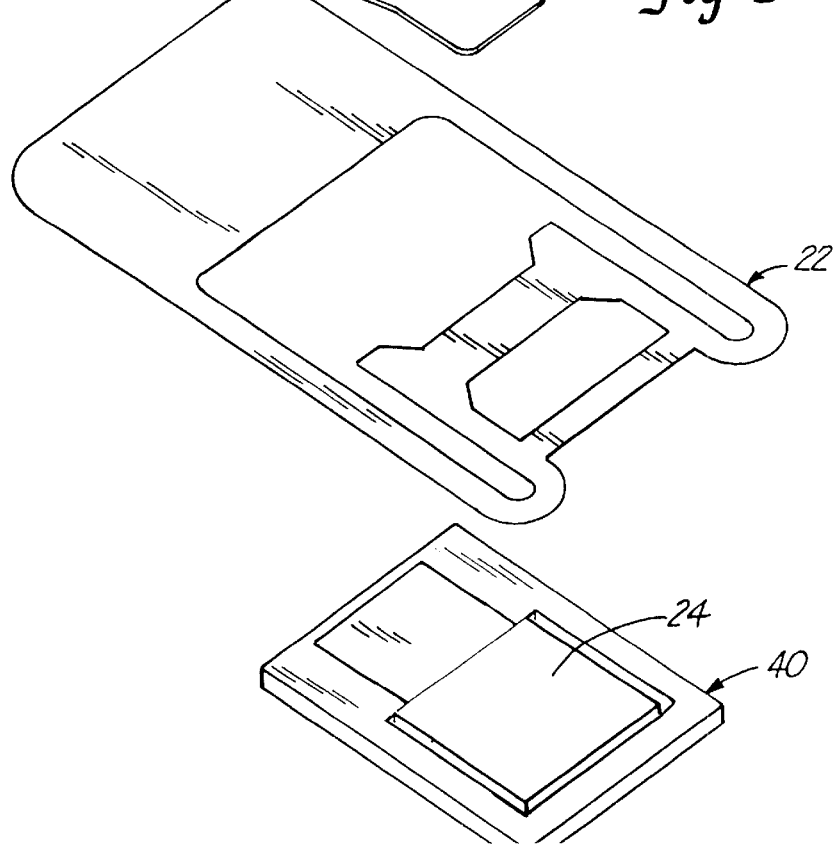

HEAD TO FLEXURE INTERCONNECTION FOR DISC DRIVE MICROACTUATOR

CROSS-REFERENCE TO RELATED APPLICATION(S)

This application claims priority from Provisional Application No. 60/133,206 filed May 7, 1999 for "COMPLIMENT MICROACTUATOR TO HEAD INTEGRATED ELECTRICAL CONNECTION" by W. Bonin.

BACKGROUND OF THE INVENTION

The present invention relates to a disc drive microactuator system, and more particularly to an improved technique for electrically connecting a transducing head to a suspension flexure in the disc drive microactuator system.

The density of concentric data tracks on magnetic discs continues to increase (that is, the width of data tracks and radial spacing between data tracks are decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

One promising design for high resolution head positioning involves employing a high resolution microactuator in addition to the conventional lower resolution actuator motor, thereby effecting head positioning through dual-stage actuation. Various microactuator designs have been considered to accomplish high resolution head positioning. Most of the microactuator designs generate relatively small forces, so that the stiffness of the portions of the microactuator associated with the moving part, or rotor, must be very low (have a very small spring constant). Similarly, if the electrical connections from the head to the flexure are made by direct wire connections, the lateral spring constant of the flexure, microactuator springs and wire connections must together be sufficiently low to permit lateral head movement to occur with the relatively small microactuation force provided. Existing flexure technology cannot achieve the required flexibility, and even if such a flexure were achievable, there would be a force bias problem generated by mechanical offsets introduced by the inherently imperfect alignment between the flexure and the slider during bonding of the flexible electrical interconnects between the flexure and the head. This would result in a position shift, or mechanical bias of the microactuator from its center position. Since the total lateral stroke of the microactuator is typically on the order of 0.5 to 20 micro-meters ($\mu$m), and the force generated by the microactuator becomes non-linear near the limits of the stroke, any bias greater than a fraction of the microactuator stroke degrades the performance of the disc drive, yet is extremely difficult to avoid if the electrical interconnects are attached directly between the head and the flexure.

There is a need in the art for an improved head to flexure electrical interconnect in a disc drive microactuator to alleviate the above-described deficiencies in the current state of technology.

BRIEF SUMMARY OF THE INVENTION

The present invention is a disc drive implementing a dual-stage actuation system with an improved technique for electrically interconnecting the transducing head and the disc drive flexure. The disc drive includes a recording disc rotatable about an axis, a slider supporting the transducing head for transducing data with the disc and at least one bond pad electrically connected to the transducing head, and the dual-stage actuation assembly supporting the slider to position the transducing head adjacent a selected radial track of the disc. The dual-stage actuation system includes a support structure supporting the slider in proximity to a surface of the disc. The support structure is coarsely positionable by a main actuator. A microactuator is also included, with a stator attached to the support structure and a rotor operatively attached to the slider. The rotor is connected to the stator by at least one flexible beam. A first electrical interconnect is formed between the support structure and the stator of the microactuator. A conductive trace is formed on the flexible beam between the stator and the rotor of the microactuator. A second electrical interconnect is formed between the rotor of the microactuator and the at least one bond pad. By electrically connecting the support structure to the stator of the microactuator, where lateral stiffness is not a critical factor, the electrical interconnection scheme does not inhibit the lateral movement of the slider and transducing head by the microactuator. The electrical interconnect between the at least one bond pad and the rotor of the microactuator maybe formed by bonding a leg of a metal lead frame to the bond pad, bending and shaping the metal lead frame to contact a first conductive region on the rotor of the microactuator, and bonding the metal lead frame to the first conductive region on the rotor. The method of forming the electrical interconnect according to the present invention may be carried out at the slider level or on a bar of sliders cut from a wafer substrate.

BRIEF DESCRIPTION OF THE DRAWINGS

FIG. 2 is an exploded view of the portion of the disc drive system implementing the microactuator and carrying the slider according to the present invention.

DETAILED DESCRIPTION

Figure 1:
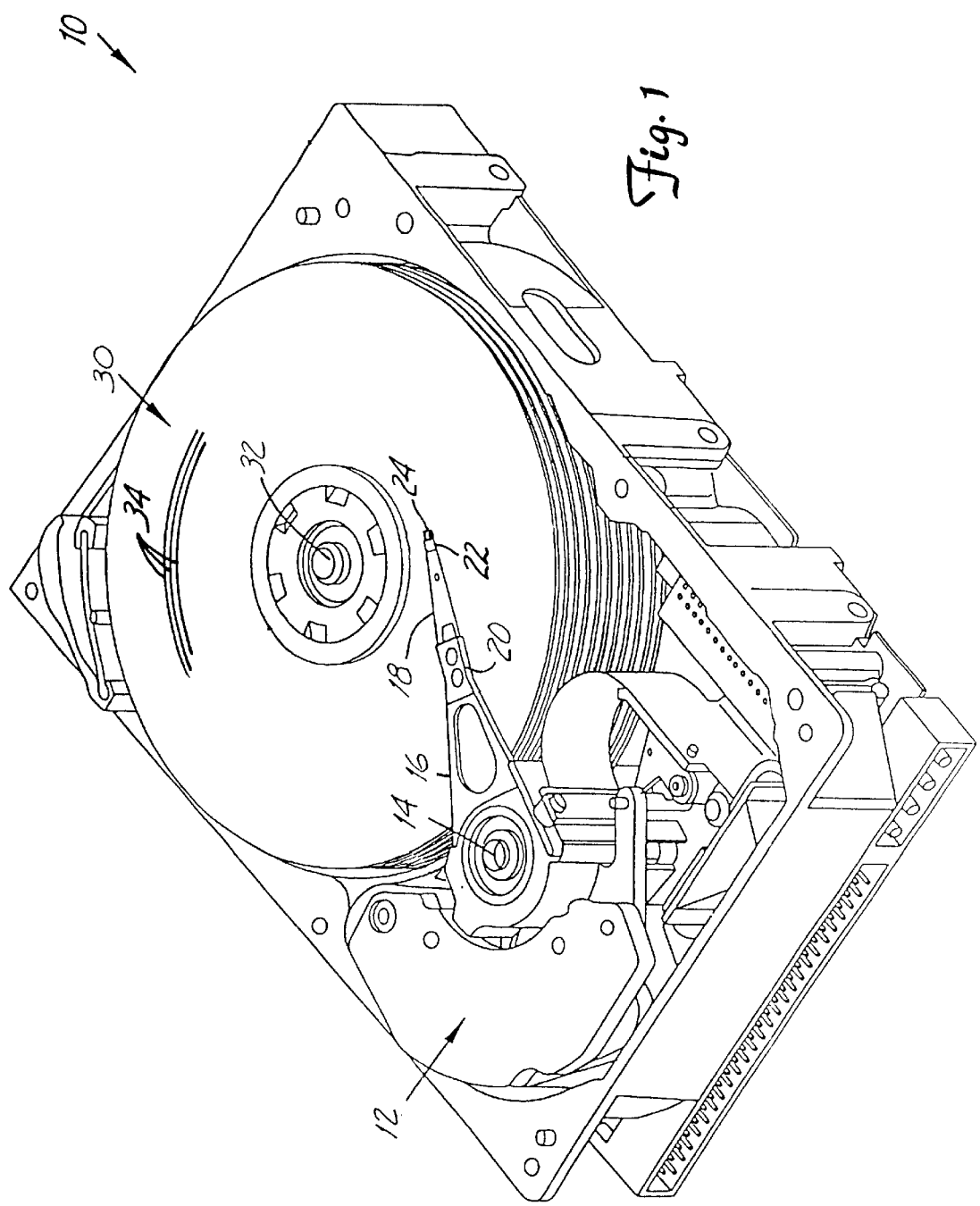
FIG. 1 is a plan view of a dual-stage disc drive actuation system according to the present invention.

FIG. 1 is a perspective view of a disc drive 10 including a dual-stage disc drive actuation system for positioning a head-carrying slider over a track 34 of disc 30. Disc drive 10 includes voice coil motor (VCM) 12 arranged to rotate actuator arm 16 on a spindle around axis 14. Head suspension 18 is connected to actuator arm 16 at head mounting block 20. A microactuator is attached to load beam 18 by flexure 22 and carries slider 24, which in turn carries a transducing head for reading and/or writing data on concentric tracks of disc 30. Disc 30 rotates around axis 32, so that windage is encountered by slider 24 to keep it aloft a small distance above the surface of disc 30.

VCM 12 is selectively operated to move actuator arm 16 around axis 14, thereby moving the transducing head carried by slider 24 between tracks 34 of disc 30. However, for disc drive systems with high track density, VCM 12 lacks sufficient resolution and frequency response to position the transducing head on slider 24 precisely over a selected track 34 of disc 30. Therefore, a higher resolution actuation device is necessary.

FIG. 2 is an exploded view of the portion of the disc drive system implementing the microactuator and carrying the slider according to the present invention. Slider 24 is carried by microactuator frame 40, which is mechanically bonded to flexure 22 to carry the structure as it follows the contours of the disc surface. Load beam 18 bears through flexure 22 with a specified pre-load force onto microactuator frame 40, which is mechanically designed to transfer the pre-load force to slider 24 to maintain slider 24 proximate to the surface of the rotating disc during operation of the disc drive. Flex circuit 42 is provided to electrically interconnect the microactuator and the transducing head or heads carried by slider 24 to control circuitry and preamplifier circuitry located remotely from the head assembly. In one embodiment, microactuator frame 40 maybe formed of a material such as silicon, with features formed by etching or a similar high resolution feature formation technique. Load beam 18 and flexure 22 are typically formed of stainless steel or a similar type of material, while flex circuit 42 may be formed of an appropriate substrate material such as polyimide.

Figure 3:
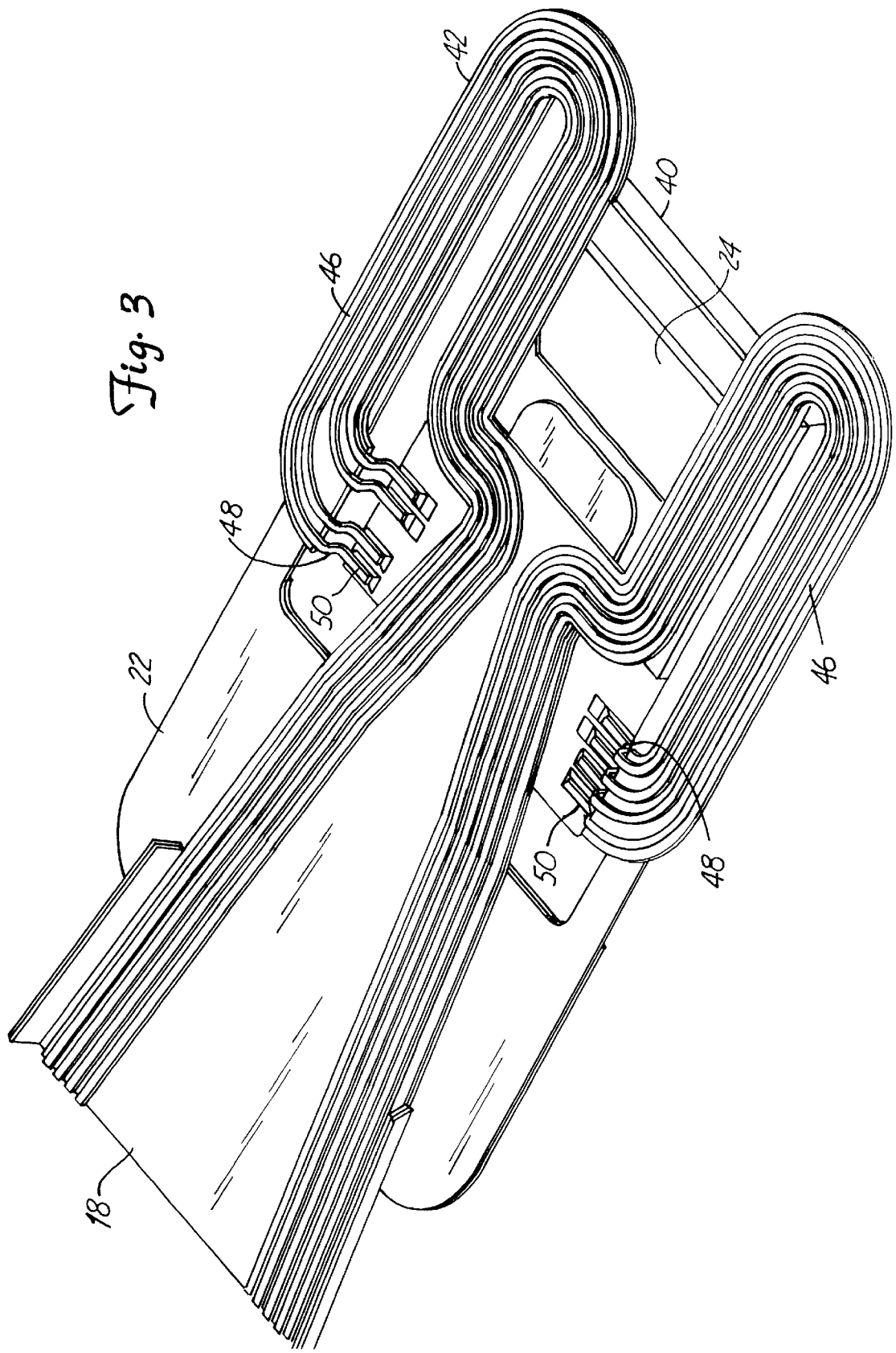
FIG. 3 is a perspective view of the assembled portion of the disc drive system shown in FIG. 2.

FIG. 3 is a perspective view of the assembled head and flexure portion of the disc drive system shown in FIG. 2. Microactuator frame 40, which carries slider 24, includes conductive bond pads 50 providing access for electrical connection to the transducing head or heads carried by slider 24, and also to the microactuator motor itself to control movement of the microactuator. Flex circuit 42 includes conductive wires 46 for interconnection to bond pads 50, with the actual electrical connection being achieved by bent portions 48 of wires 46 to contact bond pads 50 on microactuator frame 40. Because the connection between wires 46 and bond pads 50 are made at the stator portion of the microactuator, rather than at a moving portion of the microactuator such as slider 24 itself, the flexibility of bent portions 48 is not a critical design consideration, and connection may therefore be accomplished in a conventional manner. Bonding of wires 46 to bond pads 50 at bent portions 48 is achieved by ultrasonic lead bonding or a comparable attachment process known in the art.

Figure 4:
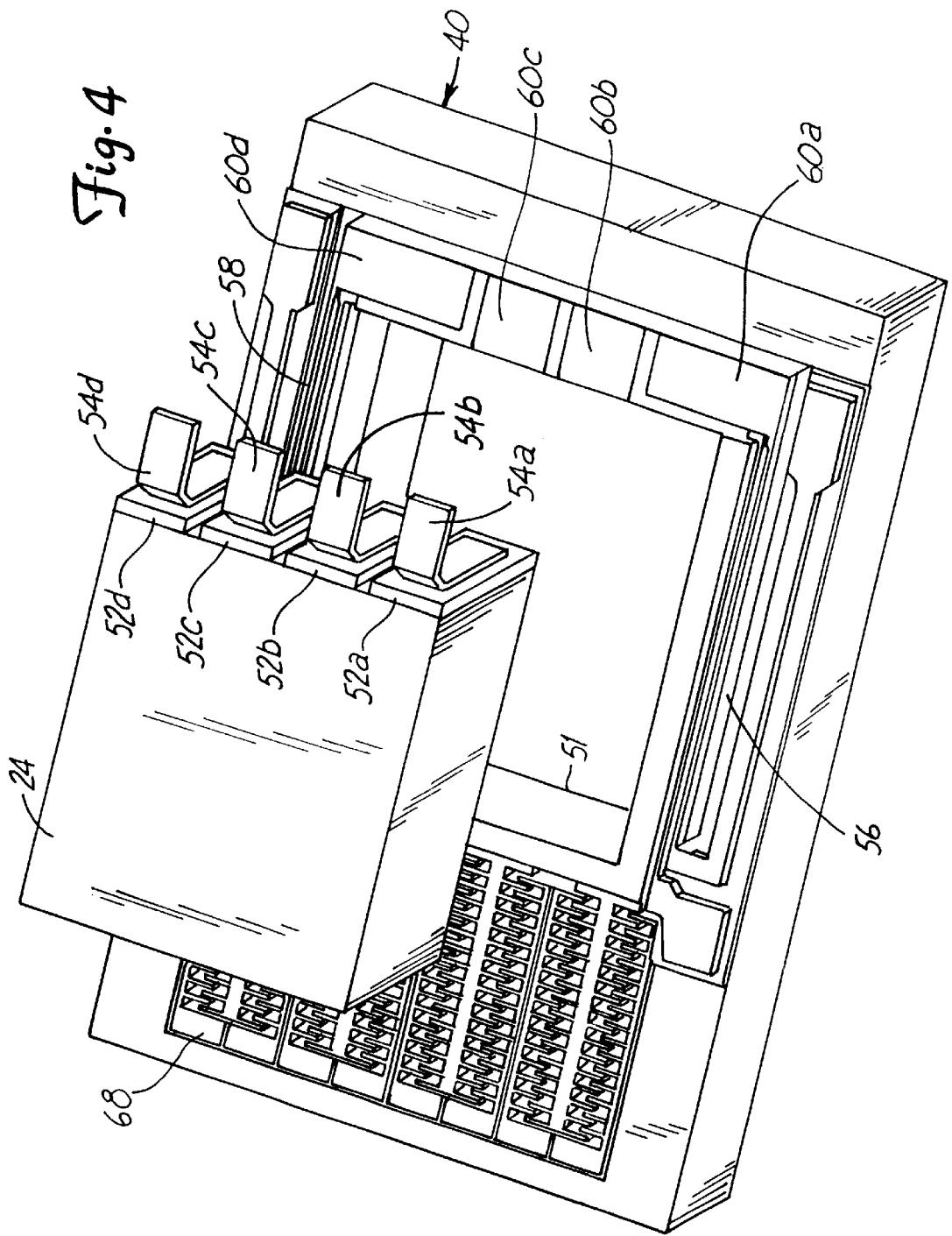
FIG. 4 is an exploded perspective view illustrating the relationship between the slider and the microactuator frame of the present invention.
Figure 5:
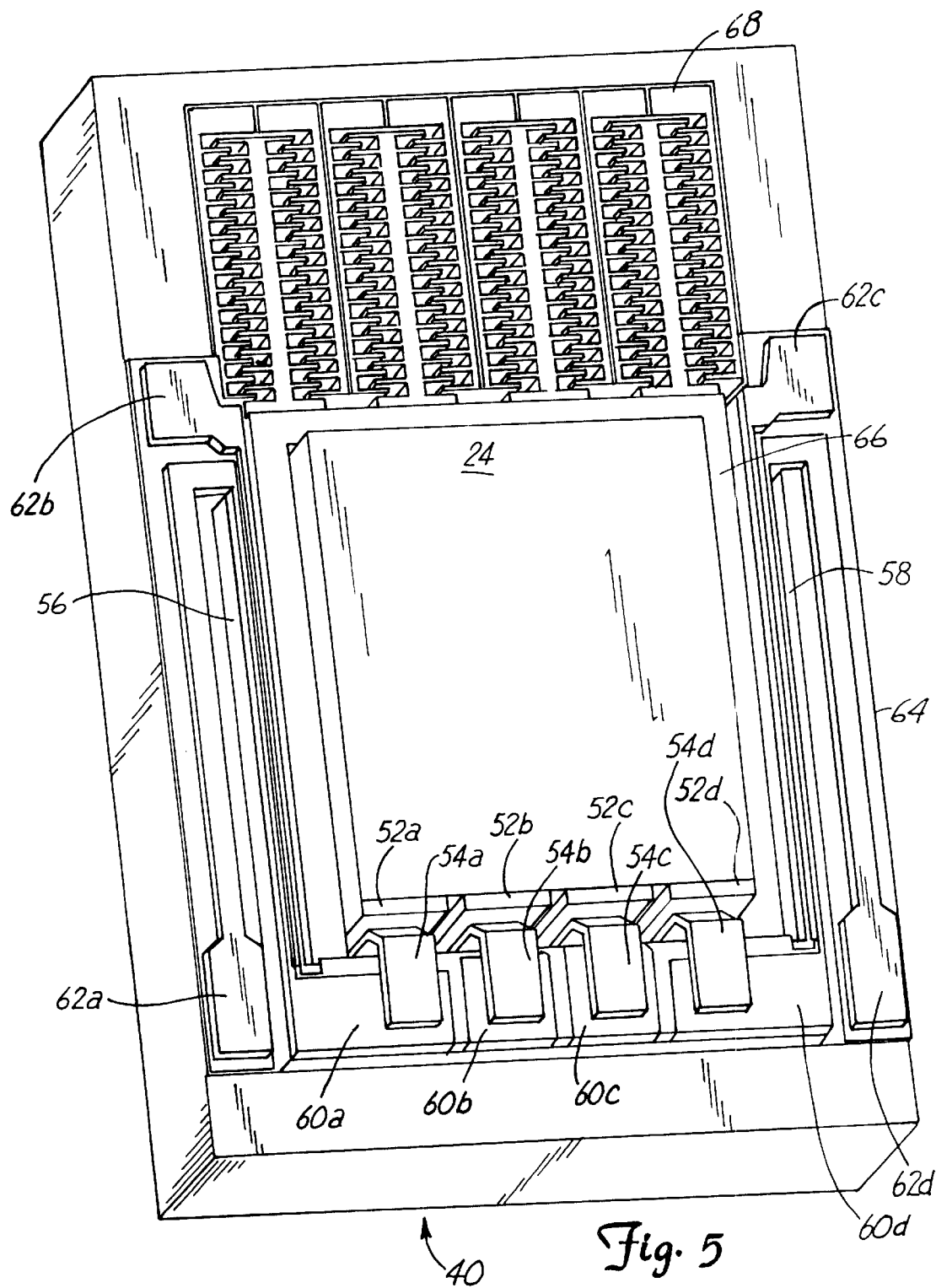
FIG. 5 is a perspective view of the microactuator frame electrically and mechanically interconnected to the slider according to a first embodiment of the present invention.

FIG. 4 is an exploded perspective view, and FIG. 5 is a perspective view of the completed assembly, illustrating the relationship between slider 24 and microactuator frame 40 according to a first embodiment of the present invention. Microactuator frame 40 includes cavity 51 for receiving slider 24. Slider 24 is preferably attached to microactuator frame 40 in cavity 51 by an adhesive such as epoxy, which fills in the small gap between slider 24 and the walls of cavity 51. In the exemplary embodiment shown in FIGS. 4 and 5, slider 24 carries one or more transducing heads that are electrically contacted by bond pads 52a, 52b, 52c and 52d on the trailing edge surface of the slider. The transducing head or heads are typically embedded in slider 24 in a manner known in the art, to avoid exposure to the elements on the outer surfaces of slider 24. Bent leads 54a, 54b, 54c and 54d are provided to contact bond pads 52a, 52b, 52c and 52d, respectively, for electrical connection to respective bond pads 60a, 60b, 60c and 60d on microactuator frame 40. In an exemplary embodiment, leads 54a, 54b, 54c and 54d are bonded to bond pads 52a, 52b, 52c and 52d and to bond pads 60a, 60b, 60c and 60d by ultrasonic direct lead bonding, or by another standard bonding process known in the art such as ball bonding, stitch bonding, conductive epoxy or reflow of plated solder. Thin conductive traces are provided on beams 56 and 58 of microactuator frame 40 to electrically interconnect bond pads 60a, 60b, 60c and 60d to respective bond pads 62a, 62b, 62c and 62d for further connection to interconnecting wires bent down from the overhanging flex circuit 42 (FIG. 3). In a preferred embodiment, an insulating layer of oxide, nitride, or a similar insulating material is provided on beams 56 and 58 to electrically insulate the conductive traces from the material forming beams 56 and 58 of microactuator frame 40.

The connection scheme shown in FIGS. 4 and 5 permits movement of the microactuator rotor with respect to the microactuator stator that is not inhibited by the inherent flexibility constraints of interconnecting leads to the transducing head or heads. Microactuator frame 40 essentially comprises outer frame 64 serving as the microactuator stator, and inner frame 66 serving as the microactuator rotor. Inner frame 66 is connected to outer frame 64 by beams 56 and 58, which are deformable in response to lateral force applied by microactuator motor 68 to alter the position of inner frame 66 (and thus slider 24) with respect to fixed outer frame 64. Thus, electrical interconnections made by bent wires from overhanging flex circuit 42 (FIG. 3) to bond pads 62a, 62b, 62c and 62d located on outer frame 64 of microactuator frame 40 do not add to the lateral stiffness of inner frame 66. As a result, the microactuator is able to perform efficiently while still allowing relatively simple electrical connection to microactuator motor 68 and bond pads 52a, 52b, 52c and 52d electrically connected to the transducing head or heads.

Figure 6:
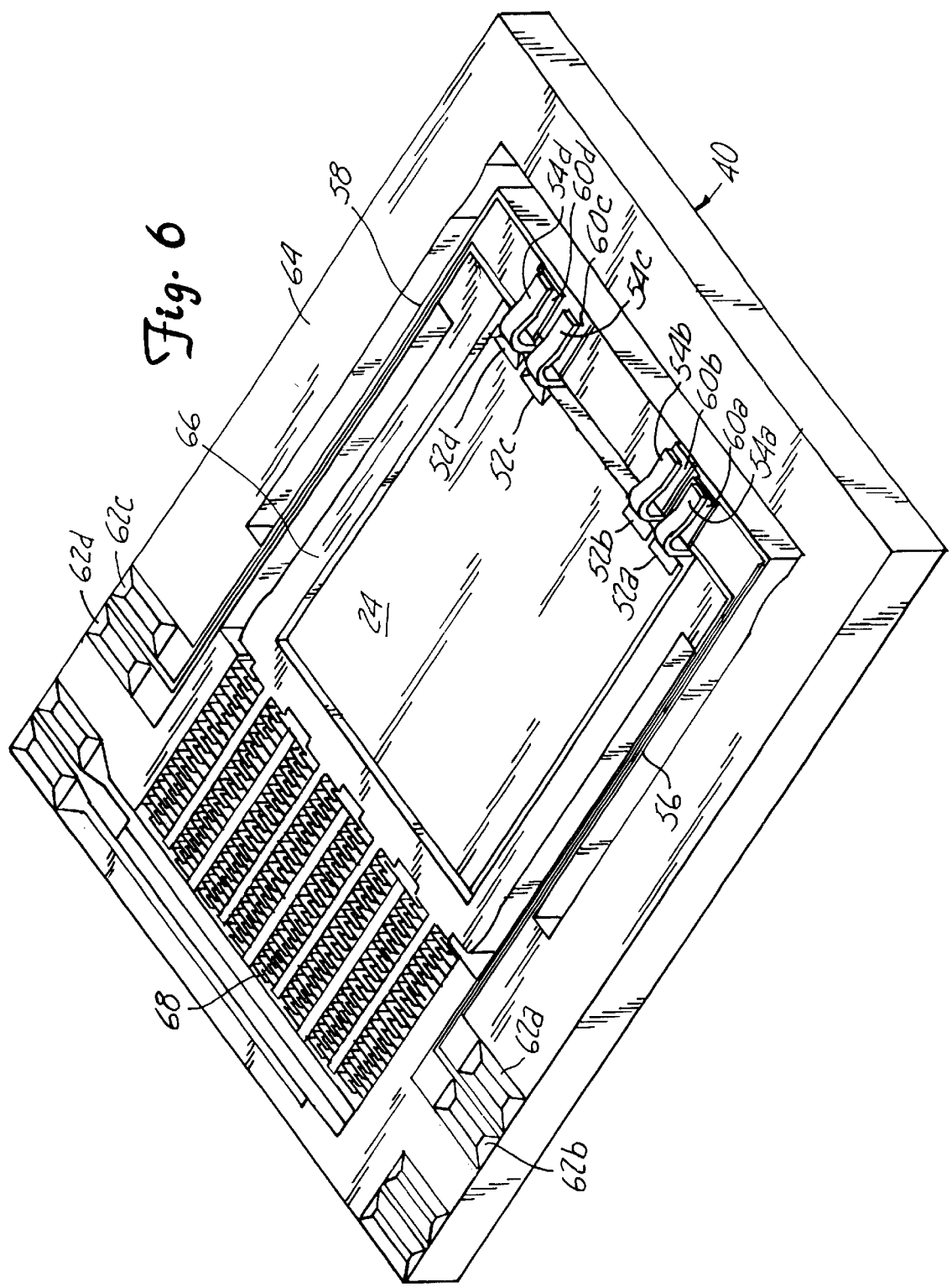
FIG. 6 is a perspective view of the microactuator frame electrically and mechanically interconnected to the slider according to a second embodiment of the present invention.

FIG. 6 is a perspective view of microactuator frame 40 electrically and mechanically interconnected to slider 24 according to a second embodiment of the present invention. The essential parts of the embodiment shown in FIG. 6 are identical to those shown in FIGS. 4 and 5, except for the arrangement of bond pads 62a, 62b, 62c and 62d on outer frame 64 of microactuator frame 40. The locations of bond pads 62a, 62b, 62c and 62d shown in FIG. 6 are compatible with the particular arrangement of bent portions 46 of conductive wires 46 shown in flex circuit 42 of FIG. 3. In addition, it should be understood that the embodiment shown in FIG. 6 illustrates a simplistic form of the microactuator frame, with single beams 56 and 58 connecting outer frame 64 to inner frame 66 and carrying the conductive traces electrically connecting bond pads 60a, 60b, 60c and 60d to respective bond pads 62a, 62b, 62c and 62d. In other embodiments of the invention, a plurality of beams on each side of the slider may instead be employed, with the conductive traces potentially being carried by different beams to ensure electrical insulation between traces. The electrical interconnecting scheme of the present invention contemplates such variations in the microactuator frame structure.

Figure 7:
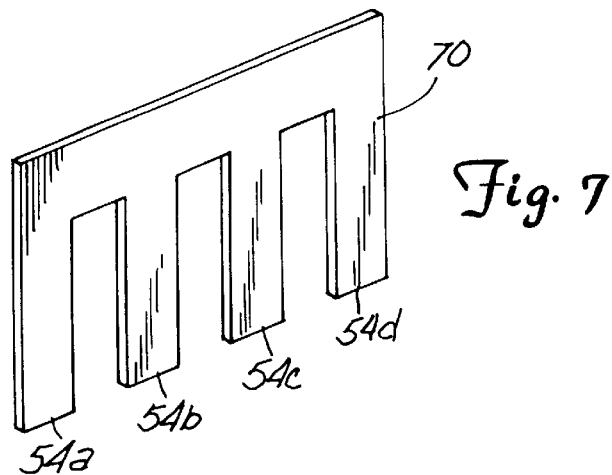
FIG. 7 is a perspective view illustrating an etched lead frame for bonding to the slider according to the present invention.
Figure 8:
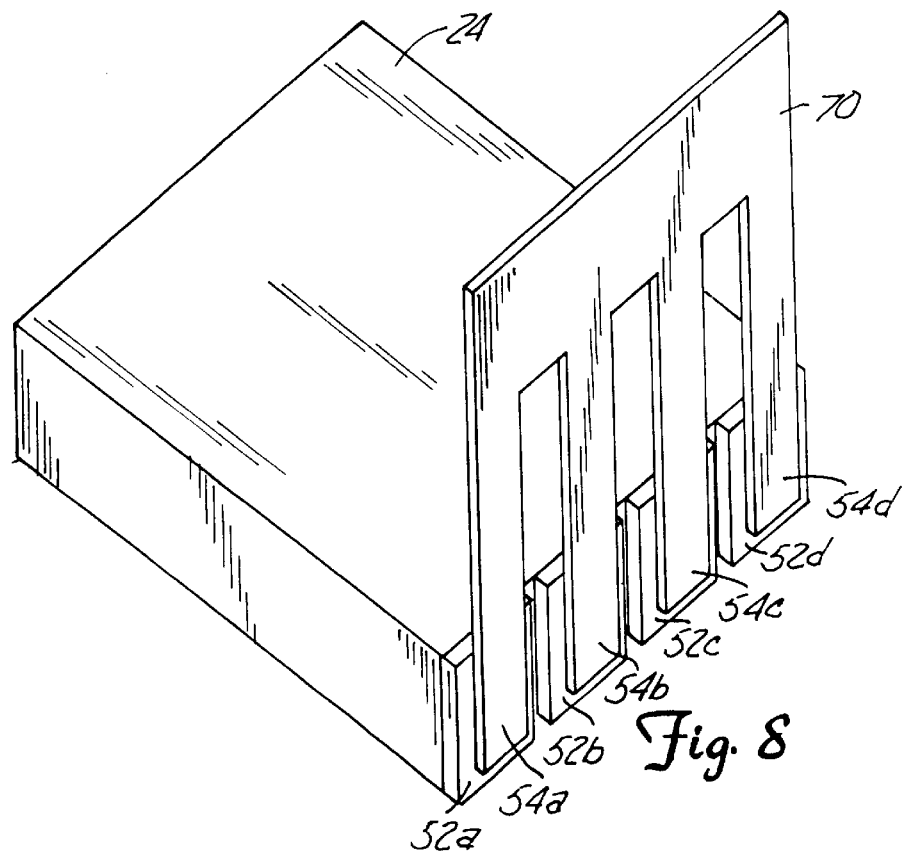
FIG. 8 is a perspective view illustrating the etched lead frame of FIG. 7 bonded to the slider according to the present invention.
Figure 9:
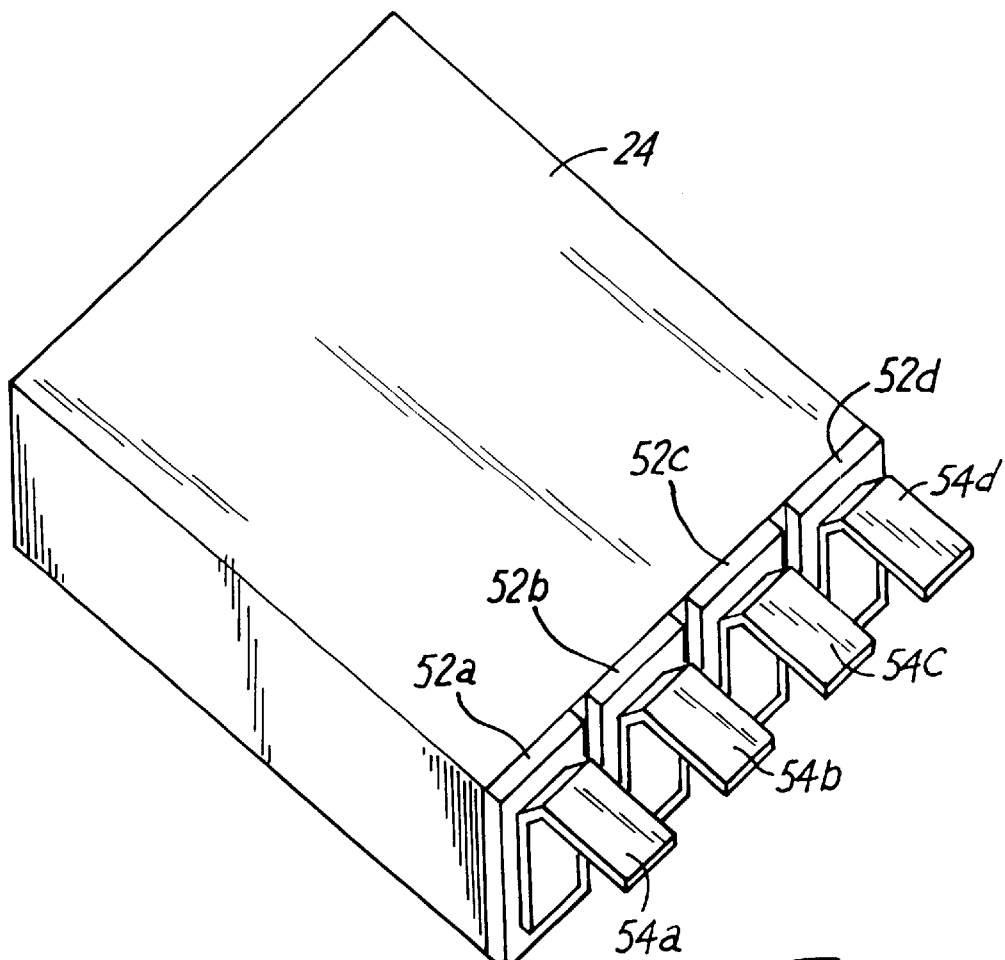
FIG. 9 is a perspective view illustrating the bent and trimmed leads of the lead frame bonded to the slider according to the present invention.

FIG. 7 is a perspective view illustrating etched lead frame 70 for bonding to slider 24 according to the present invention. Lead frame 70 is composed of a conductive material such as gold plated copper in one embodiment, and is formed to include conductive teeth defining leads 54a, 54b, 54c and 54d. Lead frame 70 is bonded to slider 24 as shown in FIG. 8, with leads 54a, 54b, 54c and 54d being connected to respective bond pads 52a, 52b, 52c and 52d electrically connected to the transducing head or heads carried by slider 24. One preferred method of bonding lead frame 70 involves bonding a series of lead frames to an entire row of sliders cut from a wafer substrate, referred to in the art as "bar-level" processing. One advantage of bar-level processing is that the lead frames provide electrostatic discharge (ESD) protection to the sliders during slider machining processes. Lead frame 70 is then bent and trimmed as shown in FIG. 9 for connection to appropriate bond pads on microactuator frame 40 (FIGS. 4–6). Maximum ESD protection is achieved when lead frame 70 is trimmed after it has been bent and bonded to bond pads 60a, 60b, 60c and 60d (FIGS. 4–6) on the microactuator frame. This technique requires additional process safeguards to ensure that the microactuator frame is not mechanically damaged while trimming lead frame 70 after bonding has occurred.

The present invention provides an improved scheme for electrically interconnecting leads from an overhanging flex circuit to a microactuator motor and one or more transducing heads carried by the disc drive slider. The interconnection scheme attaches the flex circuit leads to the stator of the microactuator, where lateral stiffness is not a critical factor, thereby allowing the microactuator rotor to move with sufficient displacement for a given amount of force generated by the microactuator motor. Electrical connection between the transducing head or heads carried by the slider (carried by the microactuator rotor) and the microactuator stator is achieved by forming leads to rigidly connect the head or heads to the microactuator rotor, and depositing thin conductive leads on the flexible beams connecting the microactuator stator to the microactuator rotor. These thin conductive leads do not materially affect the lateral stiffness of the beams themselves, and therefore do not impede the performance of the microactuator. In a preferred embodiment, the thin conductive leads on the microactuator beams may be formed simultaneously with the microactuator frame itself, for expedient processing. As a result of the present invention, microactuator motors having limited force outputs maybe used to generate sufficient microactuator strokes with low mechanical bias to ensure accurate movement for high resolution positioning of one or more transducing heads carried by the disc drive slider.

In the exemplary embodiments shown and described above, microactuator motor 68 is implemented as an electrostatic, interdigitated comb microactuator. It will be understood by those skilled in the art that other microactuator motor types may also be used in order to realize the dual-stage disc drive actuation system of the present invention, utilizing the improved electrical interconnection scheme described herein.

Although the present invention has been described with reference to preferred embodiments, workers skilled in the art will recognize that changes may be made in form and detail without departing from the spirit and scope of the invention.

What is claimed is:

1. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:

a support structure supporting the slider in proximity to a surface of the disc, the support structure being coarsely positionable by a main actuator and including a flex circuit;

a microactuator including a stator attached to the support structure and a rotor operatively attached to the slider, the rotor being connected to the stator by at least one flexible beam;

a first electrical interconnect between the flex circuit and the stator of the microactuator;

a conductive trace on the flexible beam between the stator and the rotor of the microactuator; and a second electrical interconnect between the rotor of the microactuator and at least one bond pad on the slider electrically connected to the transducing head.

2. The disc drive of claim 1, further comprising a conductive region on the stator of the microactuator.

3. The disc drive of claim 2, wherein the first electrical interconnect comprises a conductive wire bonded between a flex circuit trace of the support structure and the conductive region on the stator of the microactuator.

4. The disc drive of claim 1, further comprising a conductive region on the rotor of the microactuator.

5. The disc drive of claim 4, wherein the second electrical interconnect comprises a bent metal lead bonded between the at least one bond pad and the conductive region on the rotor of the microactuator.

6. The disc drive of claim 1, wherein the stator of the microactuator comprises an outer frame attached to the support structure and the rotor of the microactuator comprises an inner frame carrying the slider, the inner frame being connected to the outer frame by the at least one flexible beam.

7. The disc drive of claim 6, wherein the inner frame includes a cavity for receiving the slider, the slider being mechanically bonded to the inner frame therein.

8. The disc drive of claim 1, wherein the microactuator includes a microactuator motor operable to move the rotor with respect to the stator, and further comprising a third electrical interconnect between the support structure and the microactuator motor.

9. The disc drive of claim 8, further comprising at least one conductive region on the stator of the microactuator electrically connected to the microactuator motor, wherein the third electrical interconnect comprises a conductive wire bonded between a flex circuit trace of the support structure and the at least one conductive region on the stator of the microactuator electrically connected to the microactuator motor.

10. The disc drive of claim 1, further comprising an insulating layer on the flexible beam between the flexible beam and the conductive trace.

11. A method of forming a dual-stage actuation assembly for a disc drive having a recording disc rotatable about an axis, a slider supporting at least one transducing head for transducing data with the disc and at least one bond pad electrically connected to the transducing head, and a support structure supporting the slider in proximity to a surface of the disc, the support structure including a flex circuit and being coarsely positionable by a main actuator, the method comprising:

providing a microactuator having a stator attached to the support structure and a rotor operatively attached to the slider, the rotor being connected to the stator by a plurality of flexible beams and being movable with respect to the stator by a microactuator motor;

forming a fist conductive region on the rotor;

forming a second conductive region on the stator;

forming a conductive trace on at least one of the plurality of flexible beams to electrically connect the first conductive region and the second conductive region;

electrically interconnecting the second conductive region to the flex circuit; and electrically interconnecting the first conductive region to the at least one bond pad.

12. The method of claim 11, further comprising:

forming an insulating layer on the at least one of the plurality of flexible beams between the conductive trace and the at least one of the plurality of flexible beams.

13. The method of claim 11, wherein electrically interconnecting the second conductive region to the flex circuit comprises:

providing a conductive wire extending from the flex circuit to contact the second conductive region; and bonding the conductive wire to the second conductive region.

14. The method of claim 11, wherein electrically interconnecting the first conductive region to the at least one bond pad comprises:

forming a metal lead frame having a leg;

bonding the leg of the metal lead frame to the at least one bond pad;

bending and shaping the metal lead frame to contact the first conductive region on the rotor of the microactuator; and bonding the metal lead frame to the first conductive region on the rotor of the microactuator.

15. The method of claim 14, wherein the steps of bonding are performed by ultrasonic welding.

* * * * *